United States Patent

Sensui

[11] Patent Number: 5,940,635
[45] Date of Patent: Aug. 17, 1999

[54] FOCUS DETECTION OPTICAL SYSTEM IN A SINGLE LENS REFLEX CAMERA

[75] Inventor: Takayuki Sensui, Tokyo, Japan

[73] Assignee: Asahi Kogaku Kogyo Kabushiki Kaisha, Tokyo, Japan

[21] Appl. No.: 09/057,574

[22] Filed: Apr. 9, 1998

[30] Foreign Application Priority Data

Apr. 10, 1997 [JP] Japan ..................... 9-108254

[51] Int. Cl.[6] .................................. G03B 13/36
[52] U.S. Cl. ..................... 396/111; 396/272; 396/275
[58] Field of Search ................... 396/111, 114, 396/121, 122, 123, 272, 275, 268

[56] References Cited

U.S. PATENT DOCUMENTS 4,552,445  11/1985  Mukai et al. ......................... 396/114
5,752,099   5/1998  Takebayashi et al. ................. 396/111

*Primary Examiner*—W. B. Perkey
*Attorney, Agent, or Firm*—Greenblum & Bernstein P.L.C.

[57] ABSTRACT

Disclosed is a focus detection optical system of a single lens reflex camera wherein a quick return mirror directs a part of luminous flux incident through a photographic lens system towards an optical sensor unit to detect the focusing state of the photographic lens system. The quick return mirror comprises a main mirror part which transmits said part of luminous flux while reflects the other part of luminous flux, and a sub-mirror part attached to the main mirror part so as to direct the part of luminous flux having transmitted the main mirror part toward the optical sensor unit. The main mirror part is provided with an infra-red cut coat which is formed on at least partial area of the light output side surface of the main mirror part which faces the sub-mirror part.

14 Claims, 3 Drawing Sheets

FOCUS DETECTION OPTICAL SYSTEM IN A SINGLE LENS REFLEX CAMERA

BACKGROUND OF THE INVENTION

The present invention relates to a focus detection optical system in a single lens reflex camera, and more particularly to a quick return mirror for distributing a luminous flux incident from a photographic lens system to a finder optical system and to a focus detection sensor module.

Heretofore, a focus detection sensor module has been employed in a single lens reflex camera having an autofocus function. The single lens reflex camera is equipped with a quick return mirror which normally guides a luminous flux incident through a photographic lens system to a finder optical system except when exposure is executed.

The focus detection sensor module is usually disposed at the bottom portion of a camera, and reflects downwardly a luminous flux transmitted through the central area of a main mirror part of the quick return mirror by means of a sub-mirror part so that the luminous flux is incident upon the sensor module.

The focus detection sensor module has conventionally been constituted with fixing a visible field mask plate having light transmitting openings, a condenser lens, a mirror, an infra-red cut filter, a separator lens and a CCD (Charge Coupled Device) sensor unit onto a module main body so as to be arranged in this order from the side where light is incident. The infra-red cut filter may sometimes be interposed between the visible field mask plate and the condenser lens.

However, the above described conventional focus detection sensor module is constituted with so many number of components as to require a large number of assembling processes as well as a large occupation space.

SUMMARY OF THE INVENTION

It is therefore an object of the present invention to provide an improved structure of a quick return mirror which enables to reduce the number of required components in a focus detection sensor module.

For the above purpose, in accordance with the present invention, an infra-red cut coat is formed on a sub-mirror side surface of a quick return mirror. More particularly, on a light incident side surface of a main mirror part, a half mirror coat is formed for allowing a part of incident light to pass therethrough while an infra-red cut coat is correspondingly formed on the opposite surface of the main mirror part to cut off the infra-red component of the light outputting from the main mirror part.

In case the half mirror coat is formed only on the central area of the light incident side surface of the main mirror part, the infra-red cut coat is formed on the corresponding area on the opposite side surface of the main mirror part. Both coats may, however, be formed on the whole areas of both surfaces of the main mirror part.

DESCRIPTION OF THE PREFERRED EMBODIMENTS

A focus detection optical system in a single lens reflex camera embodying the invention will be described below in detail by referring the accompanying drawings.

Figure 1:
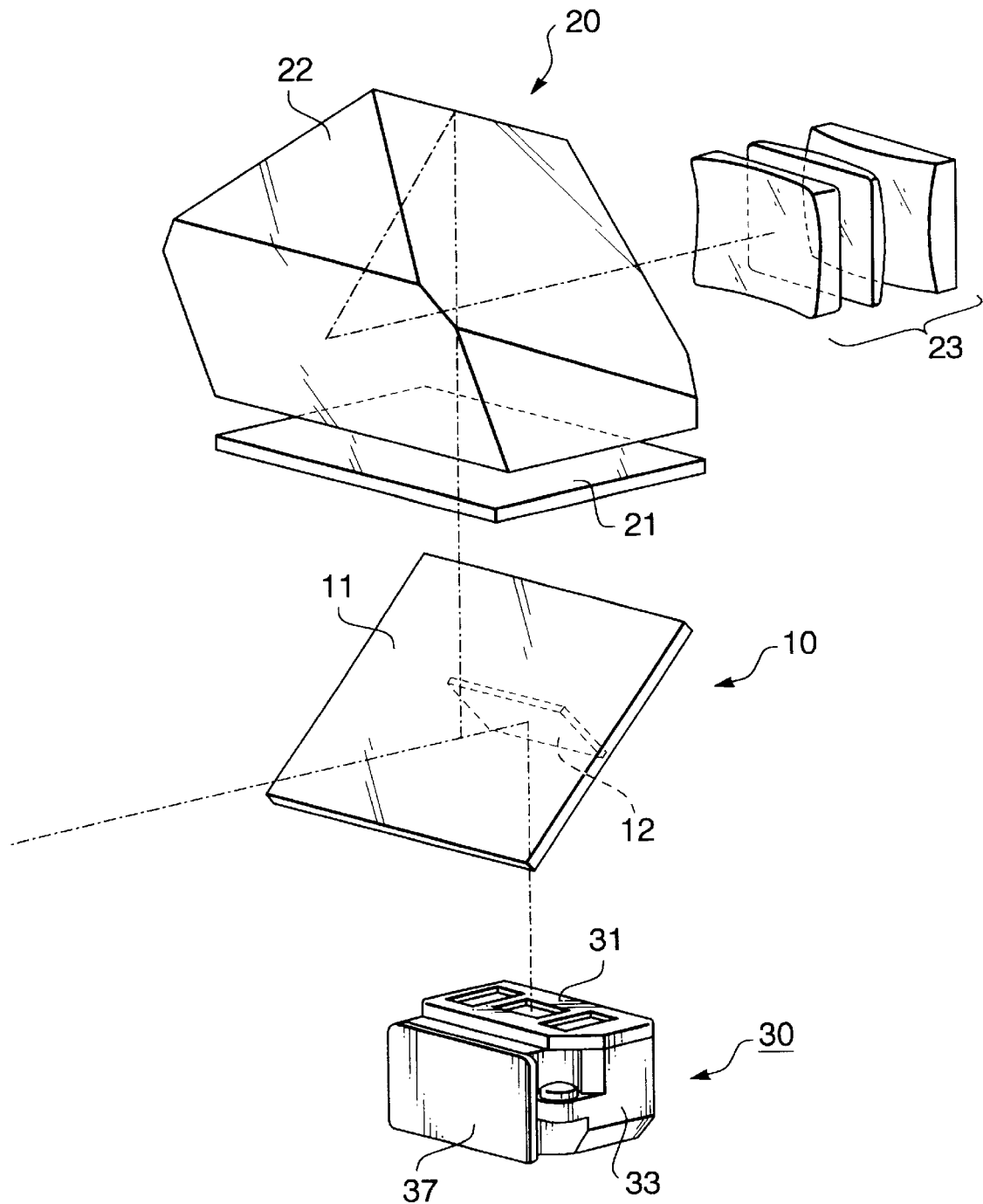
FIG. 1 is a perspective view showing a part of an optical system of a single lens reflex camera which employs a quick return mirror embodying the present invention.
Figure 2:
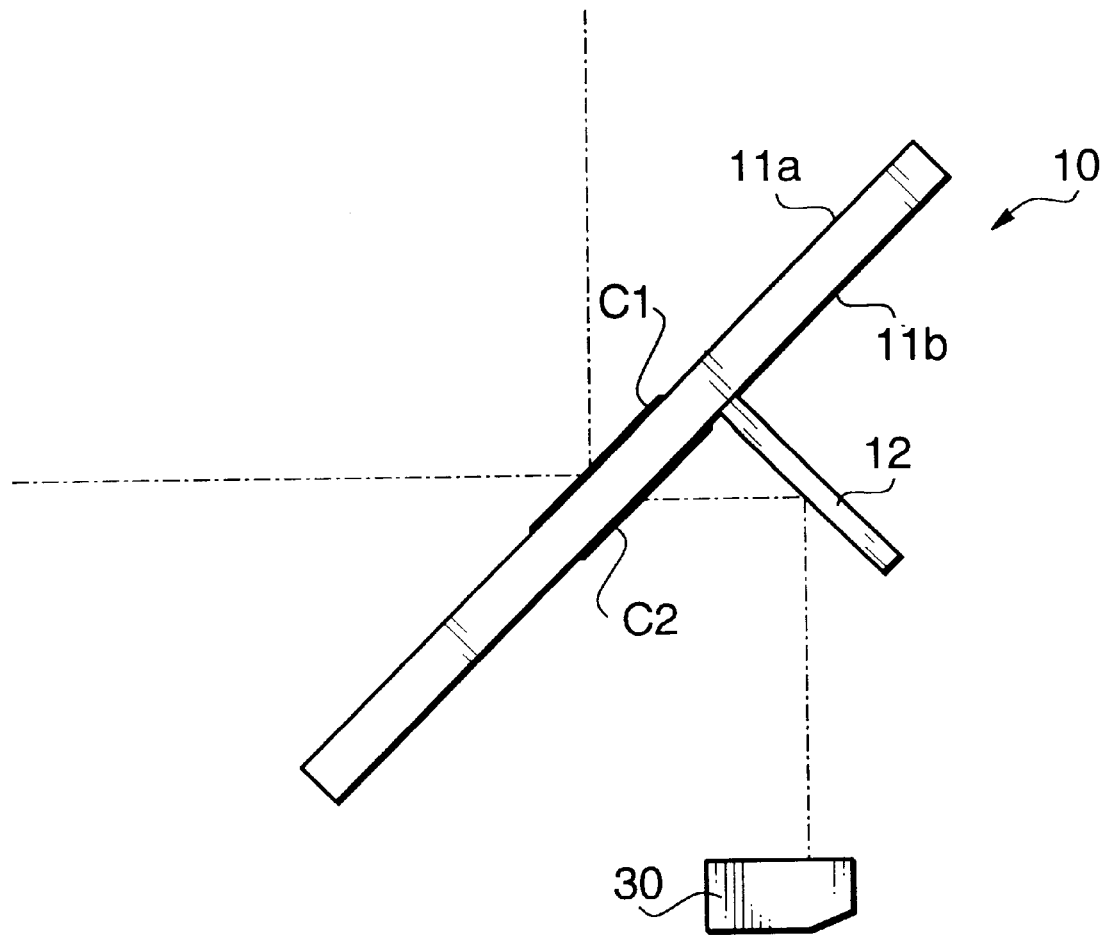
FIG. 2 is an enlarged side view of the quick return mirror shown in FIG. 1.

FIG. 1 is a perspective view showing a part of an optical system of a single lens reflex camera, and FIG. 2 is an enlarged side view of a quick return mirror employed in the optical system shown in FIG. 1.

A luminous flux transmitted through a photographic lens system (not shown) to the left-hand side in FIG. 1 is incident upon a quick return mirror 10 which is arranged in an optical path of the incident luminous flux. The quick return mirror 10 comprises a main mirror part 11 which reflects the incident luminous flux upwardly in FIG. 1, and a sub-mirror part 12.

The sub-mirror part 12 is attached to the central area of the back surface of the main mirror part 11 so as to reflect downwardly, in FIG. 1, a luminous flux transmitted through a half mirror section formed on the central area of the main mirror part 11.

The quick return mirror 10 is retracted from the optical path of the incident light only at the moment of exposure with a shutter release, and is normally situated in the optical path, as illustrated in FIG. 1. The luminous flux reflected by the main mirror part 11 is guided to a finder optical system 20. The finder optical system 20 comprises a focusing screen 21, a pentaprism 22, and an eyepiece lens system 23. On the other hand, the luminous flux reflected by the sub-mirror part 12 is incident upon a focus detection sensor module 30 which is disposed at the bottom portion of a camera body (not shown).

The focus detection sensor module 30 is constituted by a visible field mask plate 31, a module main body 33, a CCD sensor unit 37 and other components housed in the module main body 33.

As illustrated in FIG. 2, a half mirror coat C1 is formed on the central area of the surface 11a, which faces a photographic lens system (not shown), of the main mirror part 11. The surface 11a of the main mirror part 11 is constituted as a mirror surface having the light reflection ratio of about 100% except the central area thereof having the half mirror coat C1, through which a part of luminous flux is transmitted towards the sub-mirror part 12.

On the other hand, on the central area of the other surface 11b, which faces the sub-mirror part 12, of the main mirror part 11, an infra-red cut coat C2 is formed.

As the half mirror coat C1 is formed on the surface 11a, it is very difficult to design the central area of the surface 11a to also have an infra-red cut function. That is, it becomes necessary to design the coat C1 to have such a characteristic as to function as a half mirror for a visible light component and at the same time to function as an infra-red cut coat against an infra-red light component, which is not easy. Thus, in this embodiment, the infra-red cut coat C2 is formed on the other surface 11b of the main mirror part 11.

With thus constructed quick return mirror 10, the infra-red light component of the luminous flux incident through a photographic lens system can be cut off when the luminous flux passes through the main mirror part 11 of the quick return mirror 10. Accordingly, it is unnecessary to provide an infra-red cut filter in the focus detection sensor module 30, upon which the luminous flux deflected by the sub-mirror part 11b is incident. Further, as the infra-red cut coat C2 is positioned out of image forming area, even if dust or the like is adhered thereonto, it does not affect images captured by the CCD sensor unit 37.

Figure 3:
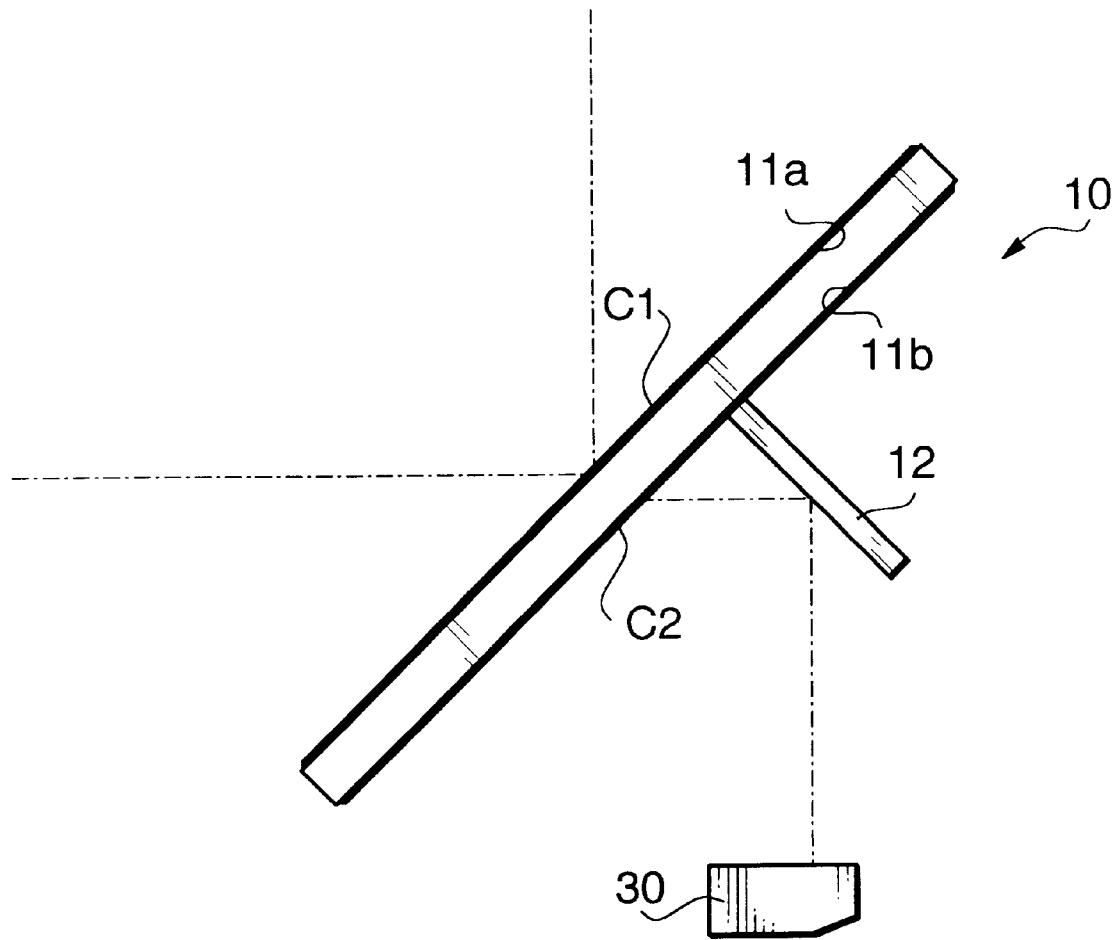
FIG. 3 is an enlarged side view of the modified quick return mirror shown in FIG. 2.

In the meantime, in the above embodiment, the half mirror coat C1 and the infra-red cut coat C2 are partly formed on the surfaces 11a and 11b of the main mirror part 11, which may, however, be formed on the whole areas of the surfaces 11a and 11b, as illustrated in FIG. 3.

The present disclosure relates to a subject matter contained in Japanese Patent Application No. Hei 09-108254, filed on Apr. 10, 1997, which is expressly incorporated herein by reference in its entirety.

What is claimed is:

1. In a focus detection optical system of a single lens reflex camera wherein a quick return mirror directs a part of luminous flux incident through a photographic lens system towards an optical sensor unit to detect the focusing state of said photographic lens system, said quick return mirror comprises a main mirror part which transmits said part of luminous flux while reflects the other part of luminous flux, and a sub-mirror part attached to said main mirror part so as to direct said part of luminous flux having transmitted said main mirror part toward said optical sensor unit; and said main mirror part being provided with an infra-red cut coat which is formed on at least partial area of the light output side surface of the main mirror part facing said sub-mirror part.

2. The focus detection optical system according to claim 1, wherein said main mirror part is further provided with a half mirror coat which is formed on at least partial area of the light incident side surface of the main mirror part, said at least partial area of the light incident side surface overlapping with that of the light output side surface.

3. The focus detection optical system according to claim 1, wherein said partial area comprises a central area.

4. The focus detection optical system according to claim 2, wherein said partial areas comprise central areas.

5. The focus detection optical system according to claim 1, wherein said infra-red cut coat is formed on the whole area of the light output side surface of said main mirror part.

6. The focus detection optical system according to claim 2, wherein said at least partial areas comprise whole areas.

7. The focus detection optical system according to claim 2, wherein said light incident side surface of the main mirror part has the light reflection ration of 100% except said at least partial area where said half mirror coat is formed.

8. A quick return mirror for a single lens reflex camera, which comprises a main mirror part which transmits a part of luminous flux incident thereonto while reflects the other part of luminous flux, and a sub-mirror part attached to said main mirror part so as to deflect said part of luminous flux having transmitted said main mirror part, and wherein said main mirror part is provided with an infra-red cut coat which is formed on at least partial area of the light output side surface of the main mirror part facing said sub-mirror part.

9. The quick return mirror according to claim 8, wherein said main mirror part is further provided with a half mirror coat which is formed on at least partial area of the light incident side surface of the main mirror part, said at least partial area of the light incident side surface overlapping with that of the light output side surface.

10. The quick return mirror according to claim 8, wherein said partical area comprises a central area.

11. The quick return mirror according to claim 9, wherein said partial areas comprise central areas.

12. The quick return mirror according to claim 8, wherein said infra-red cut coat is formed on the whole area of the light output side surface of said main mirror part.

13. The quick return mirror according to claim 9, wherein said at least partial areas comprise whole areas.

14. The quick return mirror according to claim 9, wherein said light incident side surface of the main mirror part has the light reflection ration of 100% except said at least partial area where said half mirror coat is formed.

* * * * *